United States Patent [19]
De Busscher et al.

[11] Patent Number: 4,765,238
[45] Date of Patent: Aug. 23, 1988

[54] ROUND BALER WITH EXPANDING BALE CHAMBER

[75] Inventors: Cyriel R. J. De Busscher, Damme; Adrianus Naaktgeboren, Zedelgem; Odilus A. Stael, Ichtegem, all of Belgium

[73] Assignee: Ford New Holland, Inc., New Holland, Pa.

[21] Appl. No.: 111,382

[22] Filed: Oct. 20, 1987

[30] Foreign Application Priority Data

Oct. 21, 1986 [EP] European Pat. Off. ......... 86201830.6

[51] Int. Cl.$^4$ ............................................... B30B 3/04
[52] U.S. Cl. .................................... 100/89; 56/341
[58] Field of Search .................... 100/88, 89; 56/341, 56/342, 343, 344

[56] References Cited

U.S. PATENT DOCUMENTS 4,288,971  9/1981  McClure ............................... 56/341
4,566,379  1/1986  Decoene et al. ...................... 100/89
4,612,855  9/1986  Wagstaff et al. .................. 100/88 X

FOREIGN PATENT DOCUMENTS 2626263  4/1983  Fed. Rep. of Germany .
2278241  2/1976  France .
2558031  7/1985  France .
2090560  7/1982  United Kingdom .
2150492  11/1984  United Kingdom .

Primary Examiner—Peter Feldman
Attorney, Agent, or Firm—Darrell F. Marquette; Frank A. Seemar; Larry W. Miller

[57] ABSTRACT

A round baler is provided which comprises a bale chamber which is expandable between a bale start position and a full bale position and which comprises a first bale-forming means disposed generally circumferentially around a portion of the full size bale chamber when the baler is in its bale-forming condition, and a second bale-forming means which is movable relative to the first bale-forming means between two extreme positions. The second bale-forming means is cooperable, in one extreme position, with the first bale-forming means to form the bale start chamber of reduced dimensions for starting bale formation, and, in the other extreme position, with the first bale-forming means to define a generally cylindrical bale chamber generally corresponding to a full size bale. The first and second bale-forming means are cooperable to form a round bale of crop material during movement of the second bale-forming means from the one extreme position towards the other extreme position. Part of the first bale-forming means adjacent the second bale-forming means when positioned in the full bale position is movable relative to the remainder of the first bale-forming means. Also, means are provided for moving this part of the first bale-forming means in synchronism with the movement of the second bale-forming means to and from the full bale position, whereby the second bale-forming means does not foul the first bale-forming means to and from the full bale position.

12 Claims, 3 Drawing Sheets

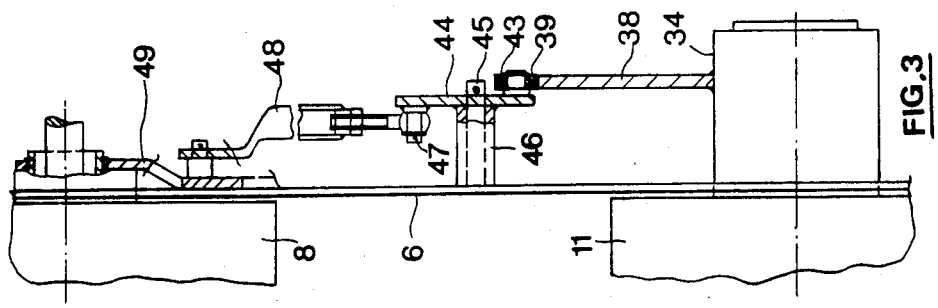
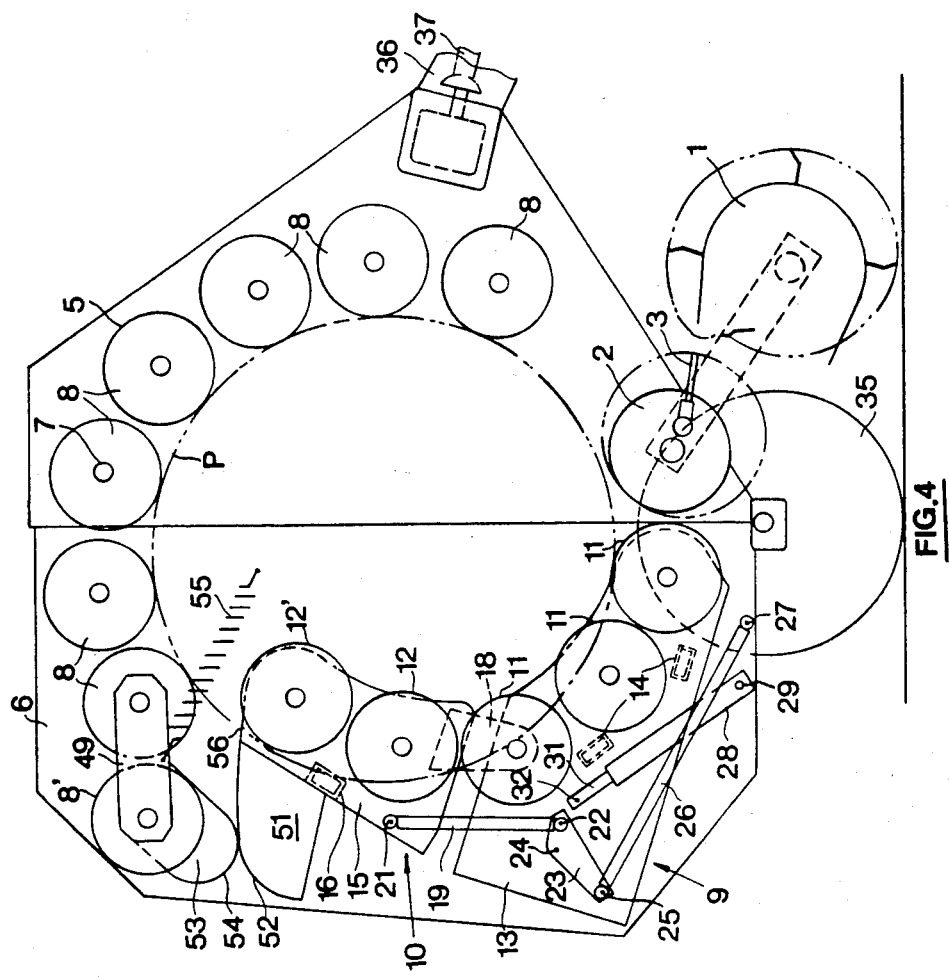

ROUND BALER WITH EXPANDING BALE CHAMBER

BACKGROUND OF THE INVENTION

This invention relates to roll baling machines which form cylindrical rolls of crop material and which are commonly referred to as round balers.

In U.S. Pat. No. 4,566,379, there is disclosed a round baler having two sets of bale-forming means which define a bale-forming chamber which is expandable from a small start chamber to a full size chamber. In order to provide the expandable bale-forming chamber, one set of bale-forming means is movable with respect to the other set but it has been found that with some crops and/or crop conditions, this is insufficient to ensure that the core of a bale being formed is properly constituted and that the bale is continually rotated during formation. It is highly desirable that the core of a bale being formed has the correct density. It is furthermore essential to ensure that a bale being formed undergoes continual rotation in order that crop material being fed into the machine is taken in and added to the bale. If bale rotation ceases, then further crop material cannot be added to the bale which thus results in the baler becoming blocked.

In co-pending U.S. patent application Ser. No. 111,379, filed Oct. 20, 1987, there is disclosed a round baler which overcomes the shortcomings of this known machine while taking advantage of the basically satisfactory general type of bale-forming means employed therein. More specifically, this copending patent application discloses a baler in which the bale-forming means which is movable relative to the other bale-forming means itself also has at least two portions which are movable relative to each other. This provides a better shape of the bale start chamber (as seen in end view). This feature provides very satisfactory results in that a bale of a required density can be formed and the bale being formed is continually rotated thus preventing any blockage of the machine.

However, it has been found that, in order to allow the one bale-forming means to move relative the other one which is fixed, (the two means eventually cooperate to define the full size bale chamber) the adjacent ends of these means have to be spaced from each other in the full bale size position by an amount which permits this relative movement without the adjacent ends fouling each other. This spacing is not optimum as regards preventing escape of crop material from the bale chamber and effecting positive drive to the bale to maintain rotation thereof. This shortcoming applies to both the baler disclosed in U.S. Pat. No. 4,566,379 and in the co-pending apolication referred to.

It is the object of the present invention to overcome the shortcomings of this known machine while taking advantage of the basically satisfactory general type of bale-forming means employed therein.

SUMMARY OF THE INVENTION

According to the present invention there is provided a round baler with a bale chamber expandable between a bale start position and a full bale position and comprising a first bale-forming means disposed generally circumferentially around a portion of the full size bale chamber when the baler is in its bale-forming condition, and a second bale-forming means, which is movable relative to the first bale-forming means between two extreme positions; said second bale-forming means being cooperable, in one extreme position, with the first bale-forming means to form the bale start chamber of reduced dimensions for starting bale formation, and, in the other extreme position, with the first bale-forming means to define a generally cylindrical bale chamber generally corresponding to a full size bale and said first and second bale-forming means being cooperable to form a round bale of crop material during movement of the second bale-forming means from the one extreme position towards the other extreme position.

This baler has an improvement in that part of the first bale-forming means adjacent the second bale-forming means when positioned in the full bale position, is movable relative to the remainder of said first bale-forming means, and means are provided for moving said part of the first bale-forming means in synchronism with the movement of the second bale-forming means to and from the full bale position, whereby the second bale-forming means does not foul the first bale-forming means in moving to and from the full bale position.

The means for moving part of the first bale-forming means may comprise cam means cooperable with a linkage mechanism to displace said movable part of the first bale-forming means. Preferably, the cam means is in the form of a sector having an arcuate cam surface in which is formed a recess and which is rotatable about an axis in unison with the second bale-forming means. The linkage mechanism preferably comprises a bell crank lever which is pivotally mounted on the baler and connected to a link extending to the movable part of the first bale-forming means; the bell crank lever carrying a roller engageable with the recess in the cam surface and being pivoted in one direction or another by the sector upon rotation thereof and when the roller is in engagement with the recess so as to move the link in one direction or another in order to displace or replace the movable part of the first bale-forming means. The link may be pivotally attached at one end to the bell crank lever and pivotally attached at the other end to one plate of a pair of plates intermediate the ends thereof; said plates interconnecting the movable part of the first bale-forming means and the adjacent part of the latter and being pivotal about an axis associated with said adjacent part of the first bale-forming means.

Preferably the first bale-forming means comprises a series of rollers with an end one thereof forming said movable part and the roller adjacent to this end one forming said adjacent part. Said axis associated with said adjacent part of the first bale-forming means is formed by the rotational axis of that roller.

Alternatively, the means for moving part of the first bale-forming means may comprise cam means associated with the second bale-forming means and cam follower means associated with the first bale-forming means and cooperable with the cam means. Spring means may be connected between the movable part of the first bale-forming means and the framework portion carrying said movable part, whereby said movable part is returned to its operative position by the spring means whenever the cam means and cam follower means do not cooperate to displace the movable part.

DESCRIPTION OF THE DRAWINGS

Round balers in accordance with the present invention will now be described in greater detail, by way of example, with reference to the accompanying drawings, in which:

FIG. 3 is a partial sectional view taken along the lines III—III of FIG. 1, and FIG. 4 is a view similar to FIG. 2 but showing an alternative embodiment.

DESCRIPTION OF THE PREFERRED EMBODIMENT

The terms "forward", "rearward", "left" and "right" used in connection with the bale and/or components thereof are determined with reference to the direction of forward operative travel of the baler and should not be considered as limiting. Also the terms "upper" and "lower" are used principally throughout this specification for convenience and it should be understood that these terms equally are not intended to be limiting.

Figure 1:
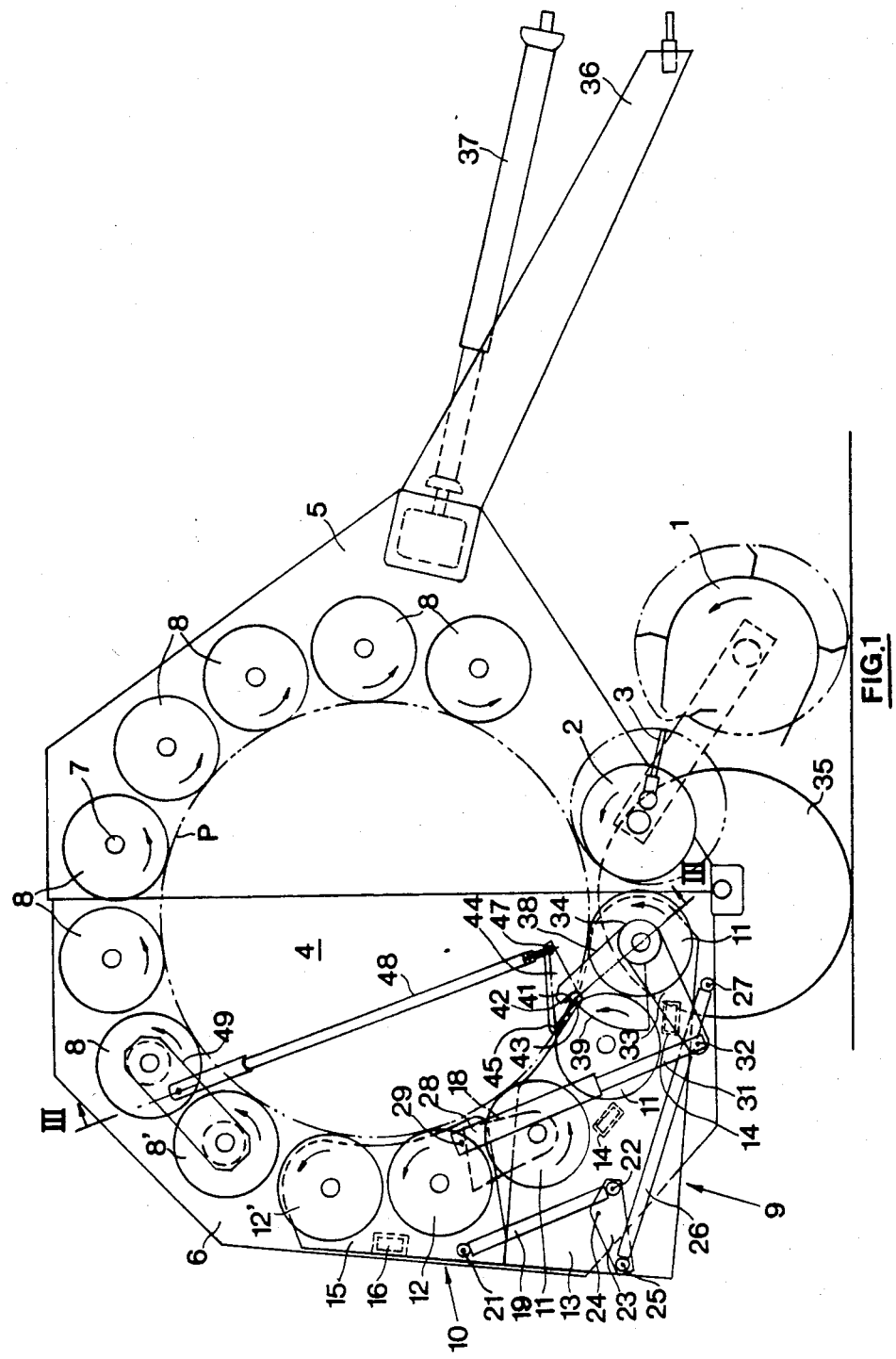
FIG. 1 is a somewhat diagrammatic side view of a first embodiment showing movable bale-forming means in one extreme position.

Referring first to FIGS. 1 and 3, the baler is generally conventional in that it comprises a crop pick-up mechanism or device 1 which is operable, when the machine is pulled across a field with crop material, to pick up said crop material from the ground and transfer it to the bale-forming chamber 4 of the baler over a bale support and feed roll 2 with retractable feed tines 3. The bale chamber 4 is made up of a main frame or front portion 5 and a rear or tailgate portion 6 which is mounted for pivotal movement about a pivot 7 on the main frame 5.

The pivot 7 extends co-axially with a top roller 8 on the main frame 5 and which forms part of a first and fixed basically set of rollers 8 spanning both the front and tailgate chamber portions 5 and 6 and disposed generally around a portion of the periphery of a fully formed bale indicated at P. The rollers 8 form a first bale-forming means, with five of the rollers being disposed in the chamber front portion 5 and three of the rollers in the tailgate portion 6.

A second bale-forming means is provided in the form of two relatively movable portions 9 and 10 with portion 9 having three rollers 11 and portion 10 having two rollers 12. The rollers 11, 12 are movable with respect to the rollers 8. The rollers 11 are mounted between opposed sidewalls 13 which are interconnected by a pair of transverse beams 14 so as to provide a rigid rectangular framework. The rollers 12 are also mounted between opposed sidewalls 15 interconnected by a transverse beam 16, again to provide a rigid framework.

The portion 10 with the rollers 12 is pivotally mounted with respect to the rollers 11 about a pivot axis which coincides with the axis of rotation of the uppermost roller 11 on the portion 9. The frameworks of the two sets of rollers are interconnected by a lug 18 at each side of the machine. The lugs 18 pivot at one end around the shaft of said uppermost roller 11 and are attached to the respective sidewalls 15 at the other end.

The rollers 11, 12 are also pivotal relative to the rest of the machine about the axis of rotation of the lowermost roller 11 and are further interconnected, at each side of the machine, by a linkage mechanism comprising a link 19 pivotally attached at one end by a pivot 21 to the associated sidewall 15 and pivotally attached at the other end by a pivot 22 to one end of an associated bell crank lever 23. Alternative pivot points (not shown) for the pivots 22 slightly displaced from the one shown may be provided in order to vary the shape of the start chamber. Each bell crank lever is in the form of a plate 23 pivotally attached at 24 to the associated sidewall 13 and with its effective and respective arms pivotally attached at 25 to one end of a further link 26 and, as already mentioned, at 22 to one end of a link 19. The other end of each link 26 is pivotally attached at 27 to the framework of the tailgate portion 6 of the baler.

A hydraulic actuator is disposed at one side of the baler and has the cylinder 28 thereof pivotally attached at 29 to the framework of the tailgate portion 6 and the piston rod 31 thereof pivotally attached at 32 to one end of a lug 33 which is rigidly attached at the other end to a bush 34 mounted coaxially on one end of the shaft of the lowermost roller 11. The bush 34 is fixedly coupled to the framework (i.e. a side wall 13) of portion 9 and is pivotal around said shaft of the lowermost roller 11 so that extension, respectively retraction of the hydraulic actuator 28, 31 causes pivotal movement of portions 9 and 10 around the axis of said lowermost roller 11. The hydraulic circuitry associated with the actuator 28, 31 is not illustrated but is similar to that disclosed in co-pending U.S. patent application Ser. No. 111,379, filed Oct. 20, 1987.

Figure 2:
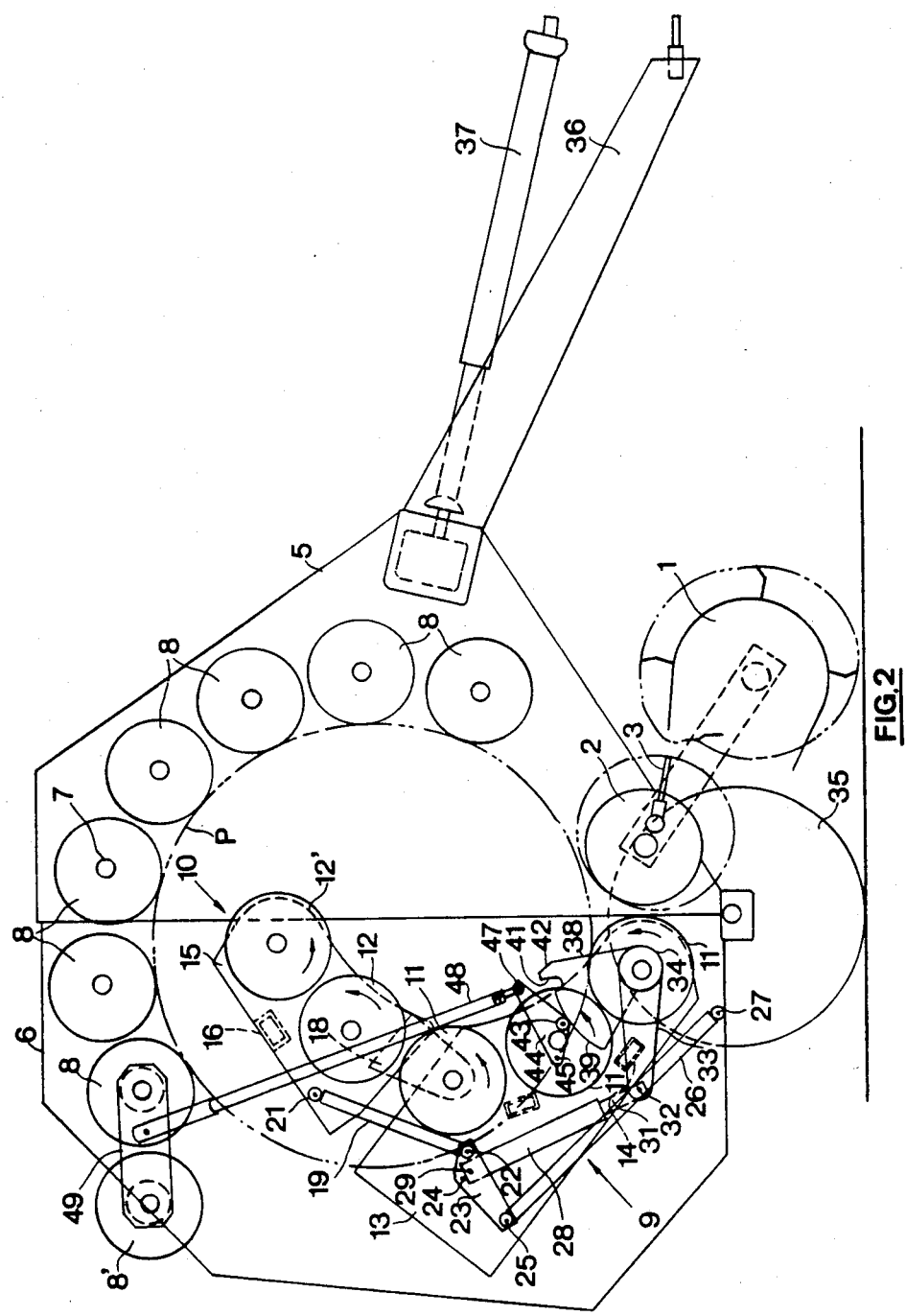
FIG. 2 is a view similar to that of FIG. 1, but showing said movable bale-forming means in an intermediate position.

The rollers 11, 12 are shown in FIG. 1 in the position adopted when a full size bale P has been formed. FIG. 2 shows the rollers 11, 12 in an intermediate position, i.e. a position adopted when the start chamber has been expanded but is not yet full size. It will be seen from FIGS. 1 and 2 that, as the rollers 11, 12 moves relative to the rollers 8 to expand the start chamber, there also is relative movement between the rollers 11 and 12 such that the included angle between the two lines joining, on the one hand, the center of the roller 11 coinciding with the pivotal mounting of the portion 10 on the portion 9 and, on the other hand, the respective centers of the adjacent rollers 11 and 12 on respectively the lower and upper portions 9 and 10, increases.

The baler is provided with a pair of ground-engaging wheels 35 and a tongue 36 by which the machine is towed by a tractor or other vehicle. The moving components of the baler are driven from the towing vehicle via a conventional power take-off shaft 37.

Returning now to the first and second bale-forming means 8 and 11, 12, it will be seen from the full size bale position shown in FIG. 1 that the uppermost roller 12' of the second means and the adjacent roller 8' of the first means are spaced apart by an amount equal to the spacing of all other adjacent pairs of rollers which is desirable both from the standpoint of preventing crop material from escaping form the bale chamber and from the standpoint of driving the bale being formed at as many equally spaced points around its perphery as possible to ensure continued rotation of the bale. However, it will also be seen that the adjacent rollers 12' and 8' would foul each other as the roller 12' moves with the other rollers 11 and 12 to and from the full size bale position shown in FIG. 1 if special steps were not taken. To this end, a cam in the general form of a sector 38 is rigidly connected to the bush 34. The curved surface 39 of the sector provides the cam surface and is formed with a notch 41, one side 42 of which is extended. The notch 41 is shown in FIG. 1 (but not FIG. 2) as being engaged by a roller 43 carried by one apex of a generally triangular plate 44.

Another apex of the plate 44 is pivotally connected at 45 to the tailgate 6 via a bracket 46, and the third apex is pivotally attached at 47 to one end of an adjustable link 48, the other end of which is pivotally attached intermediate the ends of one of the plates 49 which interconnect the shaft of the roller 8' with the shaft of the adjacent roller 8. The plates 49 are pivotally mounted about the axis of the associated roller 8 which thus means that the roller 8' is movable about the same axis.

During operation of the baler and to commence formation of a bale, the tailgate 6 is closed and the second set of bale-forming rollers 11, 12 are in the bale start position (not shown i.e. with the actuator 28, 31 contracted) so as to define the start chamber of an almost circular cross-section as already described. Conventional drive means (not shown) drive the rollers 8, 11 and 12 in the anticlockwise direction as seen in the drawings and as indicated by arrows shown in said drawings. The baler is then pulled across a field of cut crop material which is acted upon by the pick-up mechanism 1 and fed to the throat of the start chamber over the feed roller 2. The crop material is then passed to the lowermost roller 11 and is moved around the start chamber coming into contact subsequently with the roller 12, the last one of which throws the crop material onto the two lowermost rollers 8 which are rotating in a direction (as shown in the drawings by the arrows on the rollers) such as to move the crop material back downwardly, thus completing the rotational or coiling motion of the crop material.

It is found that this particular arrangement of the start chamber gives an extremely good core formation with consistent density of the desired magnitude. Furthermore, the core is rotated continuously which is not always the case with known balers, as already mentioned, and whereby blockage of the machine, caused by core stalling, is avoided.

The rollers 8, 11 and 12 which define the start chamber, offer a resistance to the expansion of the core as further crop material is added thereto, thus ensuring a required density of that core which is selected by adjusting the throttling action of a relief valve forming part of the hydraulic control circuit. As still further crop material is fed to the bale chamber, the rollers 11 and 12 eventually move in an anticlockwise direction, as seen in FIG. 1, while still maintaining the resistance required to provide a good bale density. This movement allows the bale being formed in the bale chamber to gradually increase in size as further material is rolled in a spiral pattern on the core. This anticlockwise movement of the second bale-forming means 9, 10 arises from the fact that the force exerted thereon as the bale increases in size, urges the actuator 28, 31 to gradually extend, thus moving the two portions about the axis of the lowermost roller 11.

Because of the linkage connection 19, 23, 26 between the two portions 9 and 10 and the tailgate framework 6, the portion 10 not only moves about the axis of the lowermost roller 11 but also about the axis of the uppermost roller 11, whereby said portion 10 overall rotates through a greater angle than the other portion 9. This extra movement of the portion 10 comes about by the link 26 being coupled to the tailgate framework 6 by the pivot 27 whereby the bell crank lever 23 is caused to rotate clockwise around its pivotal mounting 24 on the associated sidewall 13, as seen in FIG. 1, as soon as the portion 9 begins to rotate in the anticlockwise direction. This clockwise rotation of the bell crank lever 23 pulls the link 19 which in turn pivots the portion 10 about the axis of the uppermost roller 11.

As the size of the bale further increases, the bale chamber also expands further and eventually attains its full size 4, i.e. the rollers 11 and 12 adopt the broken line position of FIG. 1 (with the actuator 28, 31 now extended). The links 19 and 26 and the bell crank lever 23 are such that the final movements of the rollers 11 and 12 to achieve the full size chamber position are accomplished substantially simultaneously.

From the moment a bale core with a predetermined density is formed and until a full size bale is completed, the rollers 11 and 12 together with at least some of the rollers 8 and eventually, when the full bale size is reached, all rollers 8 continuously engage the bale surface with a certain pressure which is advantageous for preventing a stalling of the bale under formation. In other words, the bale being formed is positively kept in rotational motion by a plurality of bale-forming rollers 8, 11, 12 during the entire bale formation cycle. This is advantageous for avoiding a blocking of the machine on the one hand and for obtaining a well-formed bale of high and uniform density on the other hand. Any completed bale in the bale chamber 4 is wrapped in a conventional manner and, when wrapping has been completed, the tailgate 6 is pivoted upwardly about the axis 7 for the completed bale to be discharged from the machine under gravity. Once the completed bale has cleared the machine, and with the tailgate 6 still in the raised or bale-discharge position, the rollers 11, 12 forming the second bale-forming means 9, 10 pivot downwardly under gravity about the axis of the lowermost roller 11 thus contracting the actuator 28, 31 with the attendant reverse movements of the links 19 and 26, rotation of the bell crank lever 23 and relative rotation of the portions 9 and 10. Thus, the second bale-forming means 11 and 12 are returned in position ready to start the formation of a next bale but before this can be done, the tailgate 6 must be closed or lowered so that the rollers 11 and 12 adopt the bale start position (not shown) relative to the rollers 8 so as to re-define the start chamber. The lowering or pivoting of the second bale-forming means 9, 10 under gravity when the tailgate 6 is opened and the formed bale discharged, is controlled by the restrictor in the hydraulic control circuitry of the actuator 28, 31.

Having described the general operation of the baler from bale formation to discharge of a completed bale, it is now convenient to discuss the role of the present invention. As already mentioned, the uppermost roller 12' cannot move to and from the full bale position without fouling the adjacent roller 8' in view of the close spacing of these two components, whereby the roller 8' is arranged to be movable to allow the roller 12' to pass thereby. Starting first with the baler in the full bale condition of FIG. 1, when the tailgate 6 is raised to discharge the completed bale, the second bale-forming means 9, 10 pivots under gravity as already explained and this movement serves to contract the actuator 28, 31 because the cylinder is held fixed to the tailgate 6 at 29 but the lug 33 rotates clockwise (as seen in FIG. 1) so as to contract the actuator. The cam 38 also rotates clockwise in unison with the lug 33 and in so doing tends to carry with it the roller 43 which is positioned in the cam notch 41. Thereby the plate 44 is rotated anticlockwise about the pivot 45. The cam 38 and roller 43 move in unison until such time as the roller 43 disengages the cam notch 41, whereby the cam 38 then moves relative to the roller 43, the latter rolling over to the curved cam surface 39.

The anticlockwise rotation of the plate 44 serves to push the link 48 generally upwardly and thereby rotate the plates 49 about the axis of the roller 8 adjacent the roller 8'. Hence the roller 8' is pivoted clockwise about the axis of the adjacent roller 8 and is moved clear to the roller 12' which is free to move therepast to adopt the bale start position. This displacement of the roller 8' is maintained due to the cooperation between the roller 43 and the cam surface 39 also when the bale being formed in the start chamber becomes effective to expand the latter and rotates the second bale-forming means 9, 10 in an anticlockwise direction as already described.

As the second bale-forming means 9, 10 rotates anticlockwise as the bale size increases, the cam 38 rotates likewise, whereby the cam surface 39 moves relative to the roller 43 and eventually the cam extension 42 engages the roller 43 with the latter re-engaging the notch 41. As the cam 38 continues to rotate about the axis of the lowermost roller 11, it carries with it the roller 43, whereby the plate 44 is rotated clockwise so as to pull the link 48 generally downwardly and hence rotate the plates 49 to return the roller 8' to its original position which is reached after the roller 12' has passed the roller 8' and reaches its full bale position. The link 48 is adjustable so as to be able to vary the extent of rotational movement of the plates 49 and hence the displacement of the roller 8'.

Turning now to FIG. 4, this shows an alternative embodiment in which the link 48 of the previous embodiment is replaced by cams. More specifically, the sidewalls 15 on which the rollers 12, 12' are mounted are extended to provide cam plates 51 having curved cam surfaces 52, the cam plates being coplanar with the respective plates 49 which are also extended to provide cam followers 53 having curved surfaces 54. Springs 55 are connected between the respective plates 49 and the tailgate 6.

With this embodiment, when the second bale-forming means 9, 10 pivots under gravity when the tailgate 6 is raised and a previously completed bale discharged, the leading portions 56 of the cam surfaces 52 engage the adjacent portions of the respective cam followers 53 and push thereon such that the roller 8' is rotated about the axis of the adjacent roller 8 so as to be displaced to allow the roller 12' to pass. This movement of the roller 8' is against the action of the springs 55 and when the respective cam surfaces 52 and 54 disengage one another as the second bale-forming means 9, 10 moves further toward the bale start position, the springs 55 return the roller 8' to its original position.

When the second bale-forming means 9, 10 moves anticlockwise while a bale being formed in the bale chamber is approaching completion and thus, said bale-forming means 9, 10 correspondingly also are approaching their full size bale position, the now leading edges of the cam surfaces 52 re-engage the respective cam surfaces 54 so as again to displace the roller 8' to clear the way for movement of the roller 12' to the full bale position, whereupon the springs 55 return the roller 8' to its original position.

It will be noticed that, in this embodiment, the piston 31 of the actuator is connected to the portion 9 instead of the cylinder 28, whereby the actuator is contracted in the full bale position instead of being extended as in the first embodiment.

It will be seen that the present invention allows the movable roller 12' to be closely spaced from the adjacent roller 8' in the full bale position by moving the roller 8' out of the path of the roller 12' when the latter is moving to and from the full bale position. The mechanism for displacing the roller 8' is relatively simple but achieves the objective of the invention in a satisfactory manner.

Having thus described the invention, what is claimed is:

1. In a round baler with a bale chamber expandable between a bale start position and a full bale position and comprising a first bale-forming means disposed at positions generally circumferentially around a portion of the full size bale chamber when the baler is in its bale-forming condition, and a second bale-forming means which is movable relative to the first bale-forming means between two extreme positions; said second bale-forming means being cooperable, in one extreme position, with the first bale-forming means to form the bale start chamber of reduced dimensions for starting bale formation, and, in the other extreme position, with the first bale-forming means to define a generally cylindrical bale chamber generally corresponding to a full size bale and said first and second bale-forming means being cooperable to form a round bale of crop material during movement of the second bale-forming means from the one extreme position towards the other extreme position; an improvement comprised in that:

part of the first bale-forming means adjacent the second bale-forming means when positioned in the full bale position, is movable relative to the remainder of said first bale-forming means, and means are provided for moving said part of the first bale-forming means in synchronism with the movement of the second bale-forming means to and from the full bale position, whereby the second bale-forming means does not foul the first bale-forming means in moving to and from the full bale position.

2. In a round baler according to claim 1, wherein the means for moving said part of the first bale-forming means comprises cam means cooperable with a linkage mechanism to displace said part of the first bale-forming means.

3. In a round baler according to claim 2, wherein:
the cam means is in the form of a sector having an arcuate cam surface in which is formed a recess and which is rotatable about an axis in unison with the second bale-forming means; and
the linkage mechanism comprises a bell crank lever pivotally mounted on the baler and connected to a link extending to said movable part of the first set of bale-forming means; the bell crank lever carrying a roller engageable with the recess in the cam surface and being pivoted in one direction or another by the sector upon rotation thereof and when the roller is in engagement with the recess so as to move the link in one direction or another in order to displace or replace said movable part of the first bale-forming means.

4. In a round baler according to claim 3, wherein the link is adjustable in length.

5. In a round baler according to claim 4 wherein the link is pivotally attached at one end to the bell crank lever and pivotally attached at the other end to one plate of a pair of plates intermediate the ends thereof; said plates interconnecting the movable part of the first bale-forming means and the adjacent part of the latter and being pivotal about an axis associated with said adjacent part of the first bale-forming means.

6. In a round baler according to claim 5, wherein:
the first bale-forming means comprises a series of rollers with an end one thereof forming said movable part and the roller adjacent to this end one forming said adjacent part; and
said axis associated with said adjacent part of the first set of bale-forming means is the rotational axis of that roller.

7. In a round baler according to claim 2, wherein movement of the second bale-forming means is controlled by a hydraulic actuator extending between a framework portion of the baler and a member which is fixedly coupled to the subframe carrying the second bale-forming means and to which is also fixedly attached the cam means.

8. In a round baler according to claim 2, wherein the cam means and linkage mechanism cooperate such that the movable part of the first bale-forming means is displaced when the second bale-forming means starts moving from the full bale position to the bale start position and remains so until the second bale-forming means approaches its full bale position upon its return movement during bale formation.

9. In a round baler according to claim 1, wherein the means for moving part of the first bale-forming means may comprise cam means associated with the second bale-forming means and cam follower means associated with the first bale-forming means and cooperable with the cam means.

10. In a round baler according to claim 9, wherein spring means are connected between the movable part of the first bale-forming means and the framework portion carrying said movable part, whereby said movable part is returned to its operative position by the spring means whenever the cam means and cam follower means do not cooperate to displace the movable part.

11. In a round baler according to claim 1 wherein means for moving part of the first bale-forming means are provided at both sides of the baler.

12. In a round baler according to claim 1 wherein the movable part of the first bale-forming means is displaced in an outward direction away from the bale chamber when the means for moving said part become operative.

* * * * *